(12) United States Patent
Glickman et al.

(10) Patent No.: US 6,637,090 B2
(45) Date of Patent: Oct. 28, 2003

(54) LIGHTWEIGHT WINDSHIELD WIPER INSTALLATION SYSTEM

(75) Inventors: David Brian Glickman, Southfield, MI (US); Paul James Nagaitis, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 466 days.

(21) Appl. No.: 09/732,277

(22) Filed: Dec. 7, 2000

(65) Prior Publication Data

US 2002/0069500 A1 Jun. 13, 2002

(51) Int. Cl.[7] .............................................. B25B 27/00
(52) U.S. Cl. ..................... 29/270; 29/240; 15/250.23; 15/250.32
(58) Field of Search ................ 29/270, 240; 15/251.23, 15/250.32, 250.21, 250.31, 250.35

(56) References Cited

U.S. PATENT DOCUMENTS

| | | | | |
|---|---|---|---|---|
| 3,757,377 A | * | 9/1973 | Hayhurst | ................. 15/250.32 |
| 4,229,853 A | | 10/1980 | Gmeiner et al. | |
| 4,290,164 A | * | 9/1981 | van den Berg | .......... 15/250.32 |
| 4,445,249 A | * | 5/1984 | Harbison et al. | ........ 15/250.32 |
| 4,535,500 A | * | 8/1985 | Verton et al. | ............ 15/250.23 |

* cited by examiner

Primary Examiner—Joseph J. Hail, III
Assistant Examiner—Daniel Shanley
(74) Attorney, Agent, or Firm—Gigette M. Bejin

(57) ABSTRACT

A lightweight windshield wiper installation system is provided wherein the system includes a re-usable mounting device in combination with a lightweight windshield wiper assembly which does not require a connecting member. The mounting device includes a mounting arm having a first end and a second end, a first retaining means, a second retaining means. The lightweight windshield wiper installation system may further include an arm linkage, and a release handle. The mounting arm is operative to position a lightweight windshield wiper system onto a vehicle which is removably attached to the mounting arm via the first retaining means and the second retaining means. The release handle cooperates with the first retaining means and the second retaining means via an arm linkage to hold and release the lightweight windshield wiper system.

5 Claims, 2 Drawing Sheets

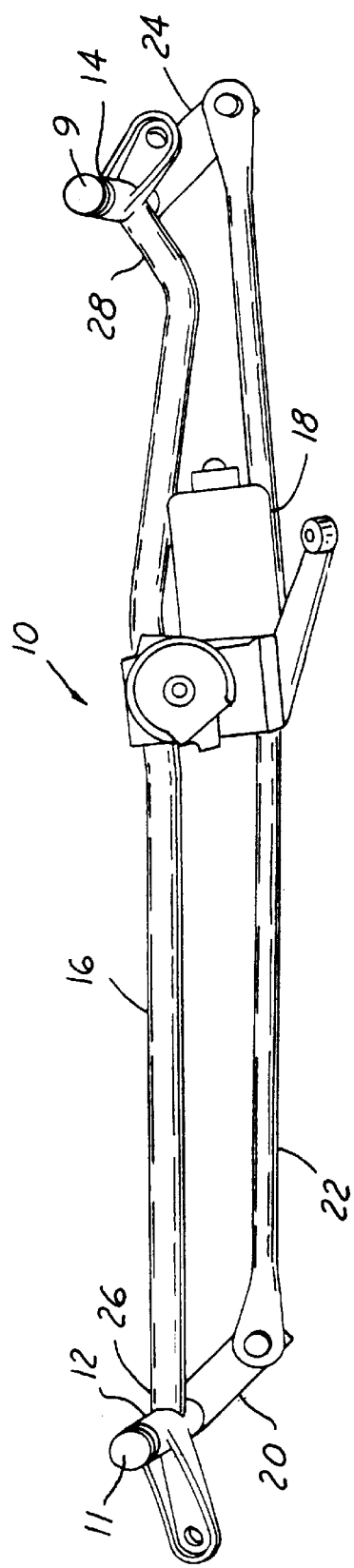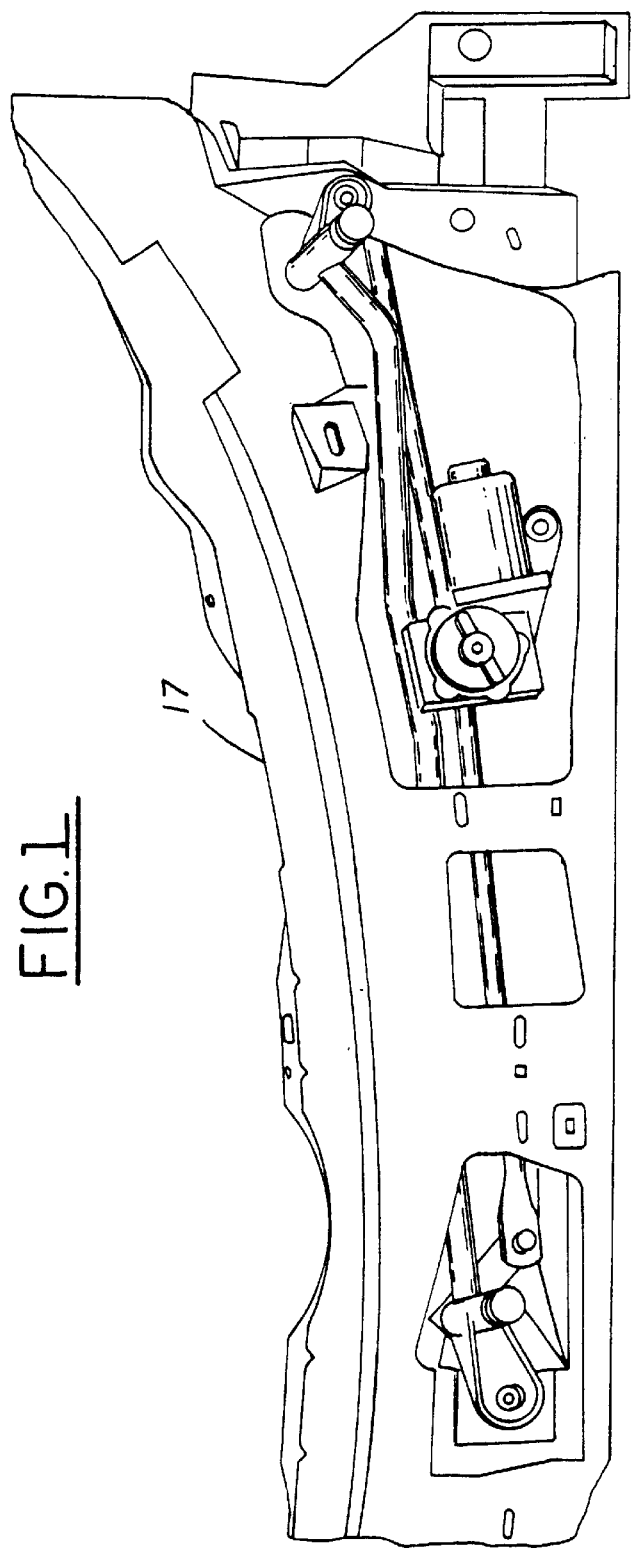
FIG. 1 (PRIOR ART)
FIG. 2 (PRIOR ART)

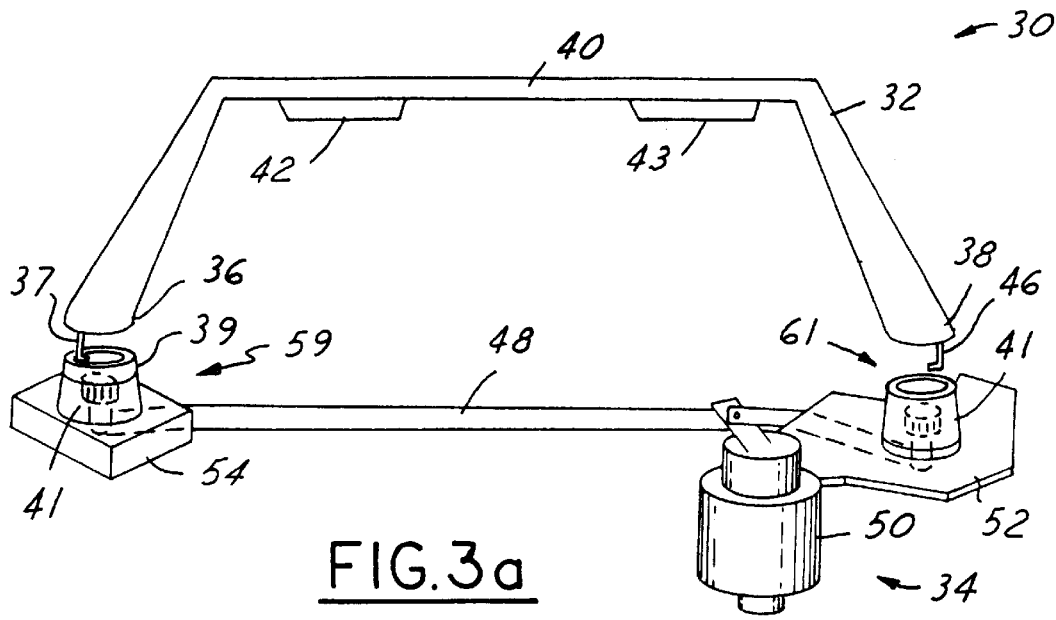
FIG. 3a
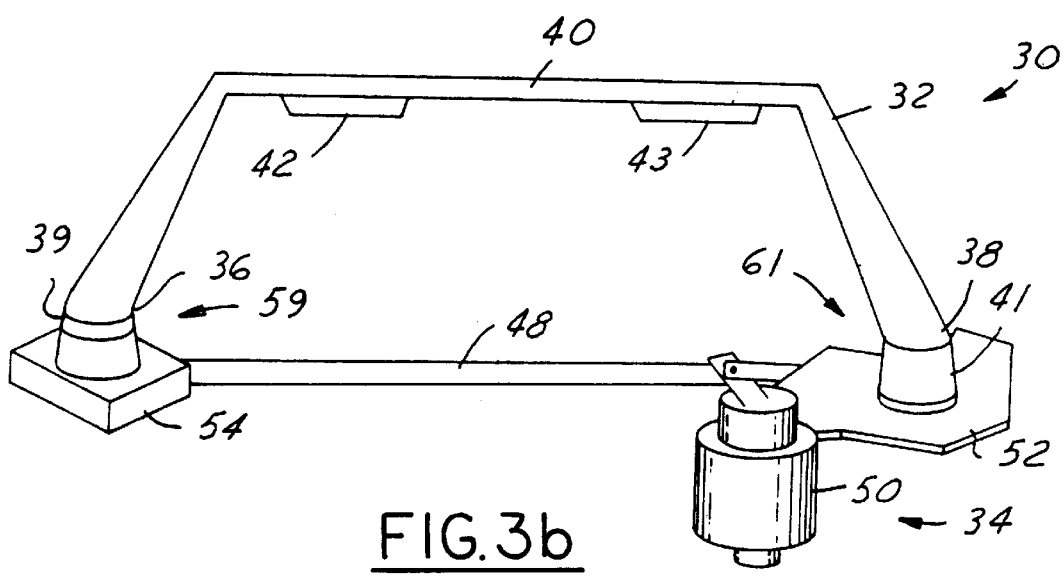
FIG. 3b
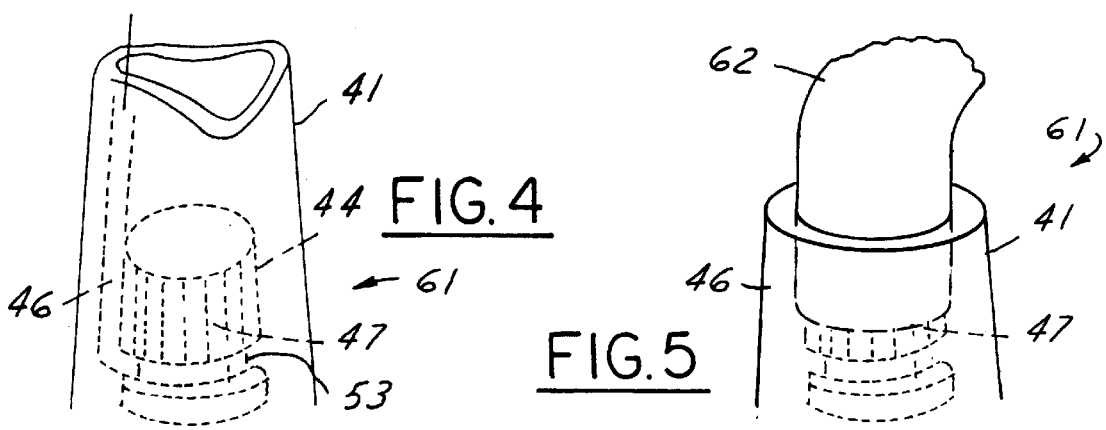
FIG. 4
FIG. 5

LIGHTWEIGHT WINDSHIELD WIPER INSTALLATION SYSTEM

FIELD OF THE INVENTION

The present invention relates to the field of product assembly.

BACKGROUND OF THE INVENTION

Product manufacturers continually seek to streamline the assembly process by reducing assembly time, labor costs, and material costs. Particularly in light of industry concerns over fuel economy, vehicle manufacturers strive to reduce vehicle weight. One way to reduce weight is to modify vehicle systems so that fewer components are required. Certain vehicle components do not play a significant role in the actual operation of a vehicle making them candidates for modification. However, components such as a connecting member in a windshield wiper assembly 16, as shown in FIG. 1 are implemented in a vehicle structure to ease the assembly process.

It is strongly preferable to install an entire automobile windshield wiper system into a vehicle as a single unit. Single units are preferred because they reduce assembly time and simplify the assembly process.

As shown in FIG. 1, a windshield wiper system 10 generally includes two pivot joints 12, 14, a connecting member 16 between the two pivot joints 12, 14, a motor 18 mounted on the connecting member 16, and linkages 20, 22, 24 which synchronize the movement between the first pivot joint 12 and the second pivot joint 14. The windshield wiper arms are mounted on the pivot shaft 9, 11 of each pivot joint 12, 14 whereby the pivot shaft 9, 11 driven by the motor 18 reciprocates the windshield wiper arms across the windshield.

The connecting member 16 may, but not necessarily, be made of die-cast steel or aluminum. As shown in FIG. 1, the connecting member 16 may also be a tubular structure. The connecting member 16 includes a first end 26 and a second end 28 where the first pivot joint 12 is mounted to the first end 26 of the connecting member 16 and the second pivot joint 14 is mounted to the second end 28 of the connecting member 16. By having the pivot joints 12, 14 mounted to each end of the connecting member, the connecting member 16 fixes the positions of the pivot joints 12, 14 relative to each other thereby easing the installation and placement of the wiper systems onto the cowl of the vehicle. The motor 18 of a windshield wiper system is also typically mounted on the connecting member 16. Accordingly, the connecting member 16 further serves to connect the various components of the windshield wiper system 10 so that the entire windshield wiper system 10 may be installed onto a vehicle as one unit.

In the assembly process, the single unit, made up of the connecting member 16 and the accompanying windshield wiper system 10, is lowered onto the cowl of the automobile. Once the pivot joints are properly positioned, the unit is affixed to the vehicle through the connecting member with bolts, welds or other fastening devices or methods. Accordingly, the connecting member remains in the vehicle after the assembly process.

The above-described system creates several design issues. First, the prior art system unnecessarily complicates the packaging under the hood of a vehicle by incorporating the connecting member 16 into the vehicle. The manufacturer must unnecessarily maneuver other vehicle components around the connecting member 16 of the windshield wiper system 10 as shown in FIG. 2. This also increases the manufacture time for the other vehicle components, as the other vehicle components must be configured or bent so that all of the components fit under the hood.

Second, the prior art systems add additional weight to a vehicle by including the connecting member as part of the modular windshield wiper system. Third, there is increased cost to manufacture a vehicle with the prior art designs given that the connecting member incorporates more material into the vehicle. Fourth, corrosion may form on each end of the connecting member thereby creating an unpleasant appearance.

Despite these concerns, vehicle manufacturers have continued to include the connecting member 16 as part of the windshield wiper system. This component has been included in order to shorten the time required to install the windshield wiper system onto a vehicle, and to keep the windshield wiper system as a single component in order to ease the installation process.

Consequently, a need has developed for a cost-effective system and method for easily installing a lightweight and compact windshield wiper system which does not require a connecting member.

SUMMARY OF THE INVENTION

It is therefore an object of the present invention to provide a re-useable mounting device which easily installs a lightweight and compact windshield wiper system onto an assembly line vehicle.

It is still another object of the present invention to provide a lightweight windshield wiper system which does not require a connecting member.

It is another object of the present invention to provide a cost-effective windshield wiper system.

It is yet another object of the present invention to provide an aesthetically pleasing windshield wiper system which resists corrosion.

In carrying out the above objects and other objects and features, a re-usable mounting apparatus in combination with a lightweight windshield wiper system is provided. The lightweight windshield wiper of the present invention does not require a connecting member between the pivot joints thereby reducing the total weight and cost of the wiper assembly. In lieu of the connecting member, a re-usable mounting apparatus is implemented where the apparatus serves to connect the various components of the windshield wiper system so that the wiper system may be installed as a single unit. The re-usable mounting apparatus also serves to spacedly distance the pivot joints during the assembly process so that the windshield wiper system may be properly positioned onto the cowl of the vehicle.

The mounting device includes a mounting arm, a first retaining means, and a second retaining means. The mounting device further includes a first end and a second end wherein the first retaining means is disposed at the first end of the mounting arm and a second retaining means is disposed at the second end of the mounting arm. The lightweight wiper system is releasably attached to the mounting arm at the first retaining means and the second retaining means whereby the first and second retaining means hold and release the first pivot shaft and the second pivot shaft of the lightweight windshield wiper system.

As noted, the lightweight windshield wiper system of the present invention does not require a connecting member thereby reducing the total weight and cost of the windshield wiper system. Accordingly, the lightweight windshield wiper system includes a motor, first and second wiper arms, first and second pivot shafts, and a linkage between the first and second pivot shafts. Via the linkage, the motor drives the first and second pivot shafts to reciprocate back and forth. The first and second wiper arms are mounted on the first and second pivot shafts such that the wiper arms also reciprocate across the windshield as the pivot shafts rotate back and forth.

As those skilled in the art will recognize, the embodiments of this invention may vary depending upon the specific requirements of a vehicle. Accordingly, the particular size and shape of the windshield wiper system, mounting arm, pivot shafts, connecting members, linkages and other components may vary, depending on the particular application.

The above objects and other objects, features, and advantages of the present invention are more readily understood from a review of the attached drawings and accompanying specification and claims.

BRIEF DESCRIPTION OF THE DRAWINGS

FIG. 1 is a schematic top view of a prior art windshield wiper system without the wiper arms before it is installed in a vehicle.

FIG. 2 illustrates the top view of the prior art windshield wiper system without the wiper arms as installed in a vehicle.

FIG. 3a is a schematic front view of a first embodiment of the present invention with the mounting arm detached from the lightweight windshield wiper system.

FIG. 3b is a schematic front view of a first embodiment of the present invention with the mounting arm attached to the lightweight windshield wiper system.

FIG. 4 is an enlarged isometric view of a pivot joint of the first embodiment of the present invention.

FIG. 5 is an enlarged isometric view of a pivot joint of the first embodiment of the present invention with a wiper arm mounted on the pivot shaft.

DETAILED DESCRIPTION OF THE PREFERRED EMBODIMENT

The present invention provides a system for installing a lightweight windshield wiper system onto the cowl of a vehicle wherein the system includes a re-usable mounting device and the lightweight windshield wiper system itself. The lightweight windshield wiper system does not require a connecting member thereby reducing the overall weight of the wiper assembly as shown in FIGS. 3a and 3b. In lieu of a connecting member, a re-usable mounting apparatus 40 is used to spacedly position the pivot joints of the lightweight windshield wiper system 34 during the assembly process. Once the wiper system 34 is installed onto the vehicle, the re-usable mounting apparatus 40 releases the wiper system onto the vehicle resulting in an easy-to-install lightweight wiper system which does not require a connecting member. Accordingly, the overall weight and cost of the wiper system is reduced.

With reference to FIG. 3a, the present invention is shown where the re-usable mounting apparatus 40 includes a mounting arm 32, a first retaining means 37 and a second retaining means 46. The re-usable mounting apparatus may be implemented as an end effector for an assembly line robot or a manual assembly device for an assembly line operator. Where the re-usable mounting device 40 is manually operated, the device may further include release handles 42, 43 or other means for actuating the first retaining means 37 and the second retaining means 46 to hold and release the wiper system. Where constructed as a robotic end effector, the apparatus does not include release handles as shown in FIG. 3a but rather is in electrical communication with a robotic device which transmits a signal to the first retaining means and the second retaining means.

The mounting arm 32 of present invention serves to spacedly distance the first pivot joint 59 and the second pivot joint 61 as the wiper assembly 34 is installed in the vehicle, thereby ensuring efficient and proper placement of the system 34 onto a vehicle. The mounting arm 32 further includes a first end 36 and a second end 38 wherein the first retaining means 37 is implemented at the first end 36 of the mounting arm 32 and the second retaining means 46 is implemented at the second end 38 of the mounting arm 32. The lightweight windshield wiper system 34 may be releaseably attached to the mounting arm 32 at the first retaining means 37 and the second retaining means 46 as described below.

Prior to installing the windshield wiper system 34 in a vehicle, the re-usable mounting apparatus holds the first pivot shaft 41 and the second pivot shaft 44 by the first retaining means 37 and the second retaining means 46 respectively shown in FIG. 3a.

With reference to FIG. 4, an enlarged view of the second pivot shaft 44 is shown where the second pivot shaft 44 is engaged with the second retaining means 46. The first pivot shaft 41 is similarly disposed within the first pivot joint 59 and is a mirror image of the second pivot shaft 44 illustrated in FIG. 4, and therefore, is not shown in the enlarged view. The first retaining means 37 and the second retaining means 46 may, but not necessarily, each be formed of a retaining clip or bracket 46 which cooperates with one or more release handles 42, 43 (shown in FIGS. 3a and 3b) such that the bracket 46 rotates toward the pivot shaft 44, under the knurled edge surface 47, and into the indented surface 53 of the pivot shaft to hold the windshield wiper system 34 to the mounting arm 32. In rotating toward the pivot shaft 44, the bracket 46 may but not necessarily cooperate with the release handles 42, 43 through an arm linkage which is disposed within the mounting arm 32. The retaining clip or bracket 46 may also rotate away from indented surface 53 of the pivot shaft 44 thereby releasing the windshield wiper system from the mounting arm 40. The retaining means 46 may also but not necessarily be comprised of a clamp which surrounds the indented surface 53 of the pivot shaft 44 when in the hold position and opens up when in the release position.

Once the mounting arm 32 has the lightweight windshield wiper system 34 in a holding position as shown in FIG. 3b, the mounting device 40 moves the wiper system 31 to the cowl of the vehicle and places the wiper system 31 onto the cowl of the vehicle so that the pivot joints 59, 61 of the wiper system 31 are properly positioned on the cowl of the vehicle. Subsequently, the operator of the re-usable mounting device 40 may depress or activate release handles 42, 43 so that the first retaining means 37 and the second retaining means 46 rotate away from the first pivot shaft 44 and the second pivot shaft respectively, thereby releasing the wiper system as shown in FIG. 3a. After releasing the wiper system, the re-usable mounting device 40 may be used to mount another windshield wiper system onto another vehicle.

Referring back to FIGS. 4 and 5, an enlarged view of the second pivot joint 61 is shown. The second pivot joint 61 is made up of a second pivot body 41 and the second pivot shaft 44. The second wiper arm 62 is mounted on the second pivot shaft 44 as shown in FIG. 5 such that the second pivot shaft driven by the motor is able to reciprocate the second wiper arm across the windshield. As shown, pivot shaft 44 includes knurls 47 which assist in retaining the position of the wiper arm. The pivot body 41 may surround the pivot shaft 44 as shown and may also serve to protect the reciprocating pivot shaft 44 from debris. As shown in FIGS. 4 and 5, the pivot joints 59, 61 each include a pivot shaft 44 and a pivot body 41 which may surround/protect the pivot shaft 44. The second wiper arm 62 is mounted on a second pivot shaft 44 having a knurled surface 47.

While the best mode for carrying out the invention has been described in detail, those familiar with the art to which this invention relates will recognize various alternative designs and embodiments for practicing the invention as defined by the following claims. For example, the system can be manufactured from aluminum, magnesium, synthetic polymeric materials or other lightweight durable materials. The words used in the specification are words of description rather than limitation, and it is understood that various changes may be made without departing from the spirit and the scope of the invention.

What is claimed is:

1. A mounting device for installing a lightweight windshield wiper system not requiring a connecting member and having a first pivot joint and a second pivot joint, the mounting device comprising:

a mounting arm having a first end and a second end, the mounting arm being operative to position a lightweight windshield wiper system onto a vehicle;

a first retaining means disposed on the first end of the mounting arm, the first retaining means being adapted to hold and release a first pivot joint of the windshield wiper system; and a second retaining means disposed on the second end of the mounting arm, the second retaining means being adapted to hold and release a second pivot joint of the windshield wiper system, wherein the mounting arm positions the first and second pivot joints on the vehicle and the first and second retaining means release the first and second pivot joints.

2. The mounting device defined in claim 1 further comprising:

a release handle disposed on the mounting arm; and a linkage connecting the release handle to the first retaining means and the second retaining means, whereby the release handle cooperates with the first retaining means and the second retaining means via the linkage to hold and to release the lightweight windshield wiper system.

3. The mounting device defined in claim 1 wherein the first retaining means is a first bracket adapted to rotate toward and away from the first pivot shaft.

4. The mounting device defined in claim 1 wherein the second retaining means is a second bracket adapted to rotate toward and away from the second pivot shaft.

5. The mounting device defined in claim 2 wherein the linkage is disposed within the mounting arm.

\* \* \* \* \*